(12) United States Patent
Neubauer

(10) Patent No.: US 9,500,480 B2
(45) Date of Patent: Nov. 22, 2016

(54) COMPASS ASSEMBLY

(71) Applicant: Fiskars Brands, Inc., Madison, WI (US)

(72) Inventor: Mark Allen Neubauer, Milwaukie, OR (US)

(73) Assignee: Fiskars Brands, Inc., Middleton, WI (US)

(*) Notice: Subject to any disclaimer, the term of this patent is extended or adjusted under 35 U.S.C. 154(b) by 122 days.

(21) Appl. No.: 14/054,481

(22) Filed: Oct. 15, 2013

(65) Prior Publication Data

US 2015/0101202 A1  Apr. 16, 2015

(51) Int. Cl.
| G01C 17/00 | (2006.01) |
| G01C 17/04 | (2006.01) |
| G01C 21/20 | (2006.01) |
| G09B 29/10 | (2006.01) |

(52) U.S. Cl.
CPC .............. *G01C 17/04* (2013.01); *G01C 21/20* (2013.01); *G09B 29/10* (2013.01)

(58) Field of Classification Search
CPC ....... G01C 21/20; G01C 17/04; G01C 17/02
USPC ........................................................ 33/355 R
See application file for complete search history.

(56) References Cited

U.S. PATENT DOCUMENTS

| 4,693,114 | A |   | 9/1987  | DeCarlo et al. |
| 6,145,209 | A | * | 11/2000 | Chang ................... G01C 17/24 33/348 |
| 6,240,647 | B1 | * | 6/2001  | Moustgaard et al. ........ 33/1 SB |
| 6,282,802 | B1 | * | 9/2001  | Iden ...................... G01C 17/04 33/347 |
| 6,295,502 | B1 |   | 9/2001  | Hancock et al. |
| 7,487,040 | B2 |   | 2/2009  | Catalinotto |
| 2013/0014398 | A1 | * | 1/2013 | Iden ...................... G01C 17/04 33/355 R |
| 2015/0101202 | A1 | * | 4/2015 | Neubauer ............... G01C 17/04 33/349 |

OTHER PUBLICATIONS

GPS Map Compass. Datasheet [online]. CasanovasAdventures. com, 2007 [retrieved on Jun. 12, 2015]. Retrieved from the Internet: <URL: http://www.triginstruments.co.nz/store/product_info.php/silva-expedition-15tdcl-compass-p-135>.*
UTM Tool for Trails Illustrated. Datasheet [online]. Boulder Map Gallery Inc., 2009 [retrieved on Jun. 12, 2015]. Retrieved from the Internet: <URL: http://bouldermapgallery.com/catalog/product_info.php?products_id=939>.*
UTM/MGRS Military Style Coordinate Grid Reader and Protractor. Datasheet [online]. Boulder Map Gallery Inc., 2009 [retrieved on Jun. 12, 2015]. Retrieved from the Internet: <URL: http://bouldermapgallery.com/catalog/product_info.php?cPath=32_126&products_id=949&osCsid=n86u6iogsliqmcg3c48bn44510>.*
Expedition 15TDCL 6400. Datasheet [online]. Silva.se, 2011 [retrieved on Jun. 12, 2015]. Retrieved from the Internet: <URL: http://www.silva.se/products/proffessional/expedition-15tdcl-6400>.*
Anonymous, "Boulder Map Gallery: Map 1-20 Accessories—Map Tools—UTM Tool for Trails Illustrated", May 15, 2009, XP055160723, Retrieved from the Internet at: http://bouldermapgallery.com/catalog/product_info.phpproducts_id=939&osCsid=3ultokmcgraocdOuponll6mit6 on Jan. 8, 2015, 2 pages.

(Continued)

*Primary Examiner* — Yaritza Guadalupe-McCall
(74) *Attorney, Agent, or Firm* — Foley & Lardner LLP

(57) ABSTRACT

A compass assembly includes a base plate having a UTM corner ruler with a first axis and a second axis, an opening extending through the base plate and along the first axis, and a compass supported by the base plate.

20 Claims, 2 Drawing Sheets

(56) References Cited

OTHER PUBLICATIONS

Anonymous, "Boulder Map Gallery: Map 1-20 Accessories—Map Tools—UTM/MGRS Military Style Coordinate Grid Reader and Protractor", May 15, 2009, XP055160722, Retrieved from the Internet at: http://bouldermapgallery.com/catalog/product_info.phpproducts_id=949&osCsid=3u1tokmairaocdOuponl16mit6 on Jan. 8, 2015, 2 pages.

Anonymous, "Brunton Eclipse Adventure 1,13,20 Racing Compass (F-8096-AR)", Nov. 24, 2011,XP055160720, Retrieved from the Internet at: http://otomasi.com/product_info.php?manufacturers_id=30&products_id=3199 on Jan. 8, 2015, 2 pages.

Anonymous, "Navigation Skills Archives—p. 7 of 9—Just TrailsJust Trails p. 7", Feb. 12, 2013, XP055160730, retrieved from the internet at http://www.justtrails.com/category/nav-skills/page/7/ on Jan. 8, 2015, 25 pages.

Johnson Outdoors, "Silva Ranger Compass model: 515", Feb. 1, 2009, pp. 1-16, XP007922951, Retrieved from the Internet at: http://www2.ca.uky.edu/Forestry/FOR250/Compass.pdf on Jan. 7, 2015, 16 pages.

International Search Report and Written Opinion for PCT application No. PCT/US2014/060422, mail date Jan. 19, 2015, 12 pages.

International Preliminary Report on Patentability, PCT/US2014/060422, Fiskars Brands, Inc., 9 pages (Apr. 19, 2016).

* cited by examiner

US 9,500,480 B2

COMPASS ASSEMBLY

BACKGROUND

The present invention relates generally to the field of compasses, particularly the field of hand-held compasses.

Compasses are used to indicate direction relative to a stationary frame of reference including the four cardinal directions: north, south, east, and west. The Universal Transverse Mercator ("UTM") coordinate system and variations or derivatives of the UTM coordinate system (e.g., the military grid reference system ("MGRS")) are geographic coordinate systems for identifying locations with a two-dimensional Cartesian coordinate system. A map marked with a UTM coordinate system or grid, a compass, and a UTM grid reader or corner ruler enable a user to navigate on land and perform field mapping.

SUMMARY

One embodiment of the invention relates to a compass assembly including a base plate having a UTM corner ruler with a first axis and a second axis, an opening extending through the base plate and along the first axis, and a compass supported by the base plate.

Another embodiment of the invention relates to a compass assembly including a base plate having a first UTM corner ruler and a second UTM corner ruler different than the first UTM corner ruler, a first opening extending through the base plate and along the first UTM corner ruler, a second opening extending through the base plate and along the second UTM corner ruler, and a compass supported by the base plate.

Another embodiment of the invention relates to a compass assembly including a transparent base plate, a first elongated slot extending through the base plate, a second elongated slot extending through the base plate, a compass supported by the base plate, and a cover pivotally coupled to the base plate. The base plate includes a first UTM corner ruler having a first axis and a second axis perpendicular to the first axis, a second UTM corner ruler different than the first UTM corner ruler, a first edge parallel to the first axis, a first ruler along the first edge, a second edge parallel to the first edge, and a second ruler along the second edge. The second UTM corner ruler has a third axis and a fourth axis. The fourth axis is perpendicular to the third axis and parallel to the first axis. The first elongated slot extends along the first axis and has a major axis parallel to the first axis. The second elongated slot extends along the third axis and has a major axis parallel to the third axis. The compass includes a needle and a bezel rotatable about a common axis.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings.

DETAILED DESCRIPTION

Figure 1:
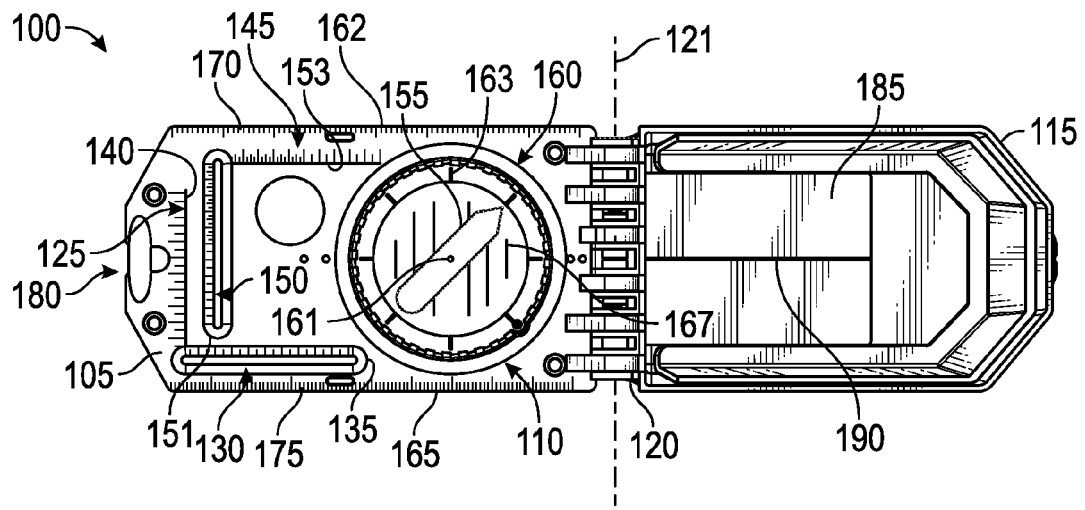
FIG. 1 is a top view of a compass assembly according to an exemplary embodiment.
Figure 2:
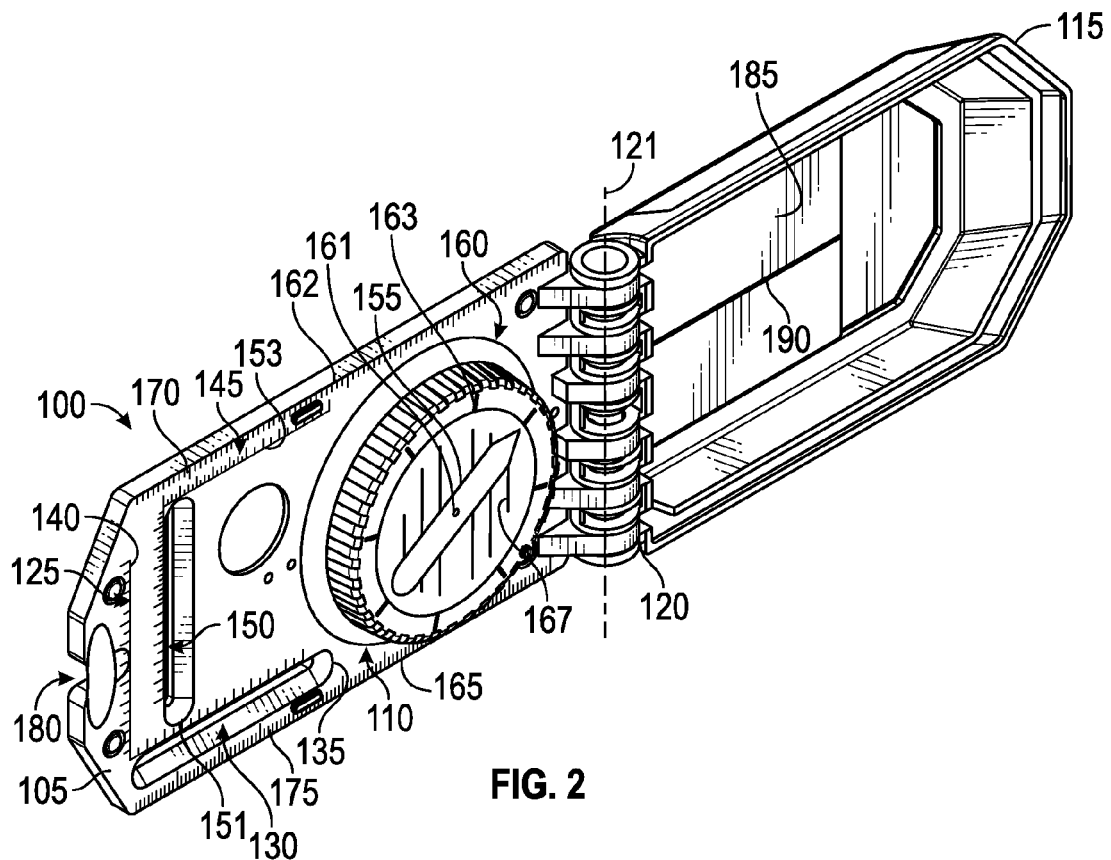
FIG. 2 is a perspective view of the compass assembly of FIG. 1 with an open cover.
Figure 3:
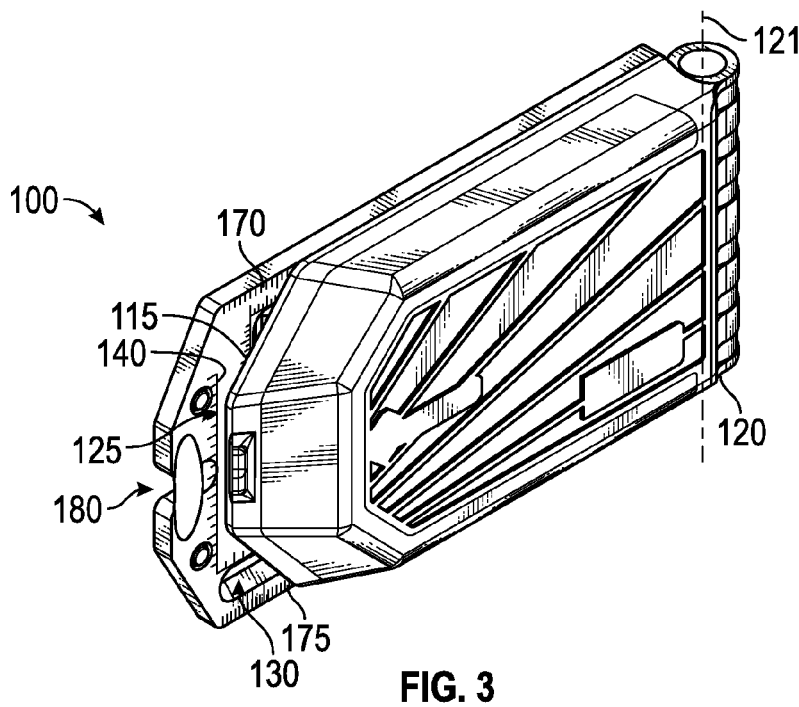
FIG. 3 is a perspective view of the compass assembly of FIG. 1 with a closed cover.
Figure 4:
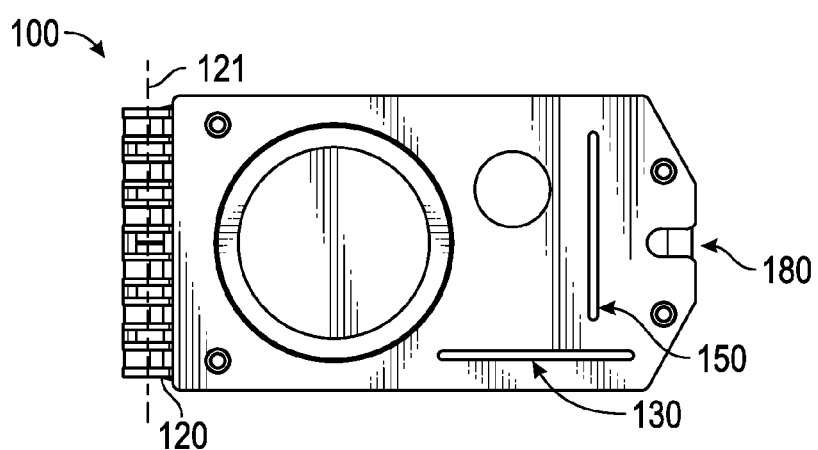
FIG. 4 is a bottom view of the compass assembly of FIG. 1 with a closed cover.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to FIGS. 1-4, a compass assembly 100 is illustrated according to an exemplary embodiment. The compass assembly 100 includes a base plate 105 supporting a compass 110 and a cover 115 pivotally coupled to the base plate 105 by a hinge 120. The cover 115 can be pivoted about a hinge axis 121 between an open position (shown in FIGS. 1 and 2 in which the compass 110 is exposed) and a closed position (shown in FIG. 3 in which the compass 110 is covered by the cover 115). In some embodiments, the cover 115 and the hinge 120 are omitted.

The base plate 105 includes a UTM corner ruler 125 and an associated opening 130. UTM corner rulers may also be referred to as UTM grids. The opening 130 extends through the base plate 105 and along the UTM corner ruler 125. The UTM corner ruler 125 includes a first axis 135 and a second axis 140. The axes 135 and 140 are perpendicular to one another and intersect at an origin. Each axis includes multiple scale graduations or markings associated with a specific map scale (e.g., a 1/24,000 scale). As shown in FIG. 1, the opening 130 is an elongated slot having a major or longitudinal axis that is parallel to the first axis 135 of the UTM corner ruler 125.

Figure 5:
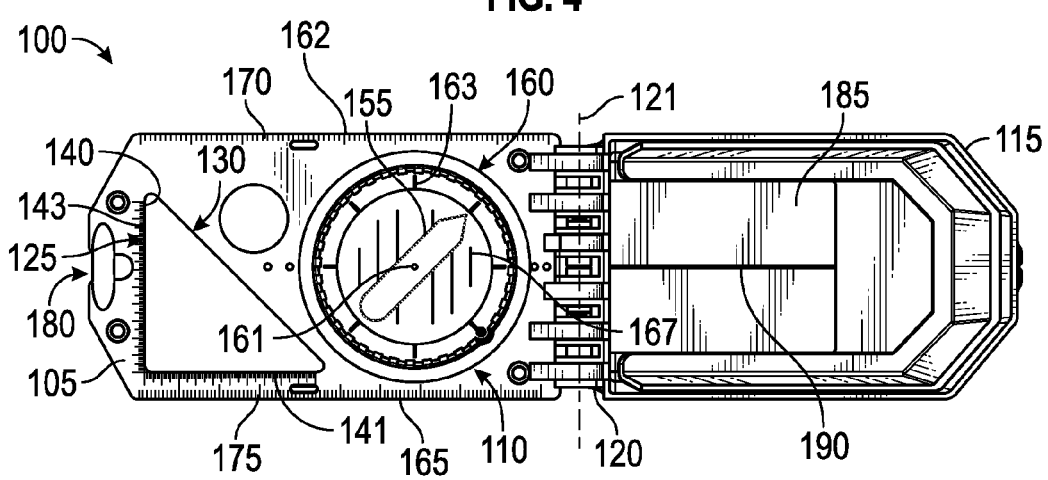
FIG. 5 is a top view of the compass assembly of FIG. 1 with an alternatively shaped opening in the base plate.

As shown in FIG. 1, the opening 130 is positioned along the first axis 135 (e.g., the axis 135 extends through the opening 130 or the opening 130 is positioned above or below the axis 135). The opening 130 at least extends from the origin where the two axes 135 and 140 meet to the last scale marking of the axis 135. The opening 130 is sized and shaped so that a user may make a marking (e.g., with a pencil, pen, marker, or other writing instrument) through the opening 130. The opening 130 allows a user to place the compass assembly 100 on a map marked with a UTM coordinate system, use the UTM corner ruler 125 on the compass assembly 100 in conjunction with the map, and mark the map through the opening 130 without needing to lift the compass assembly 100 off of the map. In some embodiments, an opening is positioned along both of the axes 135 and 140. In some embodiments, as shown in FIG. 5, the opening 130 is formed in a triangular shape so that a first side 141 of the triangle extends along the first axis 135 and a second side 143 of the triangle extends along the second axis 140.

In some embodiments, the compass assembly 100 includes more than one UTM corner ruler and associated opening, with each UTM corner ruler associated with a different map scale. For example, the first UTM corner ruler 125 could be a metric scale with graduations for both a 1/25,000 scale and a 1/50,000 scale and the second UTM corner ruler 145 could be an English scale with graduations for a 1/24,000 scale. As shown in FIG. 1, the compass assembly 100 includes a second UTM corner ruler 145 and associated opening 150. The second UTM corner ruler 145 includes a third axis 151 and a fourth axis 153 that are perpendicular to one another and intersect at an origin. The first UTM corner ruler 125 and the second UTM corner ruler 145 and the first opening 130 and the second opening 150 are arranged on the base plate 105 so as to not overlap, intersect, or otherwise interfere with one another. As shown in FIG. 1, the first axis 135 and the third axis 151 are perpendicular to one another.

The compass 110 includes a needle 155 and a bezel 160. The needle 155 and the bezel 160 rotate about a shared axis of rotation 161. The needle 155 points toward north. The bezel 160 includes compass markings 163 along an outer rim (e.g., 0 to 359 degrees with 0/360 indicating north) and a bottom surface including one or more visible straight lines 167.

In preferred embodiments, the base plate 105 is transparent. In some embodiments, at least the portion of the base plate 105 around (e.g., proximate, near, bounded by) the UTM corner rulers 125 and 145 is transparent. The base plate 105 includes two straight edges 160 and 165. As shown in the FIG. 1, the first edge 162 is parallel to the second edge 165 and to the first axis 135. The base plate 105 also includes one or more rulers for measuring a distance. As shown in FIG. 1, the base plate includes a ruler 170 for a first scale (e.g., English engineer's scale having twenty graduations per inch) along the first edge 162 and a ruler 175 for a second scale (e.g., in metric units) along the second edge 165. In some embodiments, the base plate 105 includes one or more visible straight lines (e.g., lines parallel to the first edge and the second edge, which can be used to indicate a direction of travel. The base plate 105 also includes an opening 180 for attaching a lanyard to the compass assembly 100. In some embodiments, an inner surface of the cover 115 is a mirror 185, which allows a user to view the compass 110 in the mirror and the environment behind the cover 115 at the same time. In some embodiments, the mirror includes a visible straight line 190 that is aligned with the axis of rotation 161, which helps to identify target features in the environment along a targeted bearing.

In contrast to a conventional compass having one or more UTM corner rulers on a base plate, the compass assembly 100 includes the opening 130 through the base plate 105. The UTM corner ruler of a compass can be used with a map to identify a specific location on the map by using the UTM corner ruler in combination with the corresponding UTM grid on the map. The conventional approach without the opening 130 requires the user to lift the conventional compass off of the map, mark the specific location on the map, and then replace the conventional compass on the map to confirm that the mark is at the proper location on the map. Opening 130 of the compass assembly 100 allows the user to mark the specific location on the map without needing to lift the compass assembly 100 off of the map. This embodiment of the invention reduces the amount of time needed to make the appropriate mark by eliminating the need to confirm that the mark is at the proper location. The opening 130 is intended to increase accuracy by allowing the user to make the mark with the UTM corner ruler 125 visible and in the proper position on the map rather than having to make the mark with the conventional compass and its UTM corner ruler away from the map.

Conventional UTM grid protractors often include triangular openings with sides extending along the axes of the UTM corner ruler, but do not include a compass. In order to perform navigation with a conventional UTM grid protractor and a map, a compass is also required. This separate compass is an additional piece of equipment that could be forgotten, misplaced, or lost by a user. By combining the UTM corner ruler 125 and the compass 110 in the compass assembly 100, the user is not left in a situation where he has access to a UTM grid but not a compass, or vice versa.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A compass assembly, comprising:
   a base plate including a UTM corner ruler having a first axis and a second axis;
   an opening extending through the base plate and along the first axis; and
   a compass supported by the base plate;
   wherein the compass and the UTM corner ruler are arranged so that a user can simultaneously use the compass and mark a map through the opening without removing the compass assembly from the map.

2. The compass assembly of claim 1, wherein the opening defines an elongated slot having a major axis parallel to the first axis.

3. The compass assembly of claim 1, wherein the opening defines a triangle having a first side extending along the first axis and a second side extending along the second axis.

4. The compass assembly of claim 1, wherein the base plate further includes a second UTM corner ruler having a third axis and a fourth axis; and further comprising:
   a second opening extending through the base plate and along the third axis.

5. The compass assembly of claim 4, wherein the first axis and the third axis are perpendicular to one another.

6. The compass assembly of claim 4, wherein the opening defines an elongated slot having a major axis parallel to the first axis; and
   wherein the second opening defines an elongated slot having a major axis parallel to the third axis.

7. The compass assembly of claim 4, wherein the opening defines a triangle having a first side extending along the first axis and a second side extending along the second axis; and
   wherein the second opening defines a triangle having a first side extending along the third axis and a second side extending along the fourth axis.

8. The compass assembly of claim 4, further comprising:
   a cover pivotally coupled to the base plate.

9. The compass assembly of claim 8, wherein the base plate is transparent.

10. The compass assembly of claim 1, further comprising:
    a cover pivotally coupled to the base plate.

11. The compass assembly of claim 10, wherein an inner surface of the cover comprises a mirror.

12. The compass assembly of claim 1, wherein the base plate is transparent.

13. A compass assembly, comprising:
a base plate including a first UTM corner ruler and a second UTM corner ruler different than the first UTM corner ruler;
a first opening extending through the base plate and along the first UTM corner ruler;
a second opening extending through the base plate and along the second UTM corner ruler; and
a compass supported by the base plate;
wherein the compass and the first and second UTM corner rulers are arranged so that a user can simultaneously use the compass and mark a map through the first or second opening without removing the compass assembly from the map.

14. The compass assembly of claim 13, wherein the first opening defines an elongated slot and the second opening defines an elongated slot.

15. The compass assembly of claim 14, further comprising:
a cover pivotally coupled to the base plate.

16. The compass assembly of claim 15, wherein the base plate is transparent.

17. The compass assembly of claim 13, wherein the first opening defines a triangle and the second opening defines a triangle.

18. The compass assembly of claim 13, further comprising:
a cover pivotally coupled to the base plate.

19. The compass assembly of claim 13, wherein the base plate is transparent.

20. A compass assembly, comprising:
a transparent base plate including
a first UTM corner ruler having a first axis and a second axis perpendicular to the first axis,
a second UTM corner ruler different than the first UTM corner ruler, the second UTM corner ruler having a third axis and a fourth axis, the fourth axis perpendicular to the third axis and parallel to the first axis,
a first edge parallel to the first axis,
a first ruler along the first edge,
a second edge parallel to the first edge, and
a second ruler along the second edge,
a first elongated slot extending through the base plate and along the first axis, the first elongated slot having a major axis parallel to the first axis;
a second elongated slot extending through the base plate and along the third axis, the second elongated slot having a major axis parallel to the third axis;
a compass supported by the base plate, the compass including a needle and a bezel rotatable about a common axis; and
a cover pivotally coupled to the base plate;
wherein the compass and the first and second UTM corner rulers are arranged so that a user can simultaneously use the compass and mark a map through the first or second elongated slot without removing the compass assembly from the map.

\* \* \* \* \*